(12) United States Patent
Jung et al.

(10) Patent No.: US 8,573,351 B2
(45) Date of Patent: Nov. 5, 2013

(54) UNITED TYPE MOTOR DRIVEN POWER STEERING SYSTEM

(75) Inventors: Daesuk Jung, Hadong-gun (KR); Unkoo Lee, Seoul (KR); Soobo Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 287 days.

(21) Appl. No.: 13/251,950

(22) Filed: Oct. 3, 2011

(65) Prior Publication Data

US 2012/0111656 A1 May 10, 2012

(30) Foreign Application Priority Data

Nov. 8, 2010 (KR) .................. 10-2010-0110483

(51) Int. Cl.
*B62D 15/00* (2006.01)
(52) U.S. Cl.
USPC .............................. 180/400; 280/775; 74/493
(58) Field of Classification Search
USPC ............. 180/400, 404; 280/775, 777; 74/493, 74/492, 575, 529
See application file for complete search history.

(56) References Cited

U.S. PATENT DOCUMENTS

| | | | |
|---|---|---|---|
| 7,255,368 B2 | 8/2007 | Gerlind | |
| 7,293,481 B2 | 11/2007 | Li et al. | |
| 8,146,945 B2 * | 4/2012 | Born et al. | 280/775 |
| 2004/0144192 A1 * | 7/2004 | Tomaru et al. | 74/492 |
| 2012/0180594 A1 * | 7/2012 | Park | 74/493 |

FOREIGN PATENT DOCUMENTS

| | | |
|---|---|---|
| JP | 2008-120229 A | 5/2008 |
| KR | 10-2006-0034799 A | 4/2006 |
| KR | 10-2006-0044035 A | 5/2006 |
| KR | 10-2007-0005974 A | 1/2007 |
| KR | 10-2007-0005975 A | 1/2007 |
| KR | 10-2009-0100496 A | 9/2009 |
| KR | 10-2010-0046739 A | 5/2010 |

* cited by examiner

*Primary Examiner* — Tashiana Adams
(74) *Attorney, Agent, or Firm* — Morgan, Lewis & Bockius LLP

(57) ABSTRACT

A u-MDPS (United Motor Driven Power Steering) system includes one MDPS motor, one MDPS ECU that assists steering force using power of the MDPS motor, and has a logic implementing tilting-up/down and telescopic movement, and a multi-function generator that switches a power transmission path of the MDPS motor to the steering path for assisting a steering force, the tilt path for tilting up/down a column tube, or the telescopic path for facilitating a telescopic movement of the column tube. The multi-function generator may include a motor power converting unit, a motor power transmitting unit and a tilt•telescopic motion unit. The tilt•telescopic motion unit further includes an electromagnetic clutch, which makes it possible to implement fail-safety function by switching to a lock-manual mode of one MDPS motor.

16 Claims, 10 Drawing Sheets

FIG.4
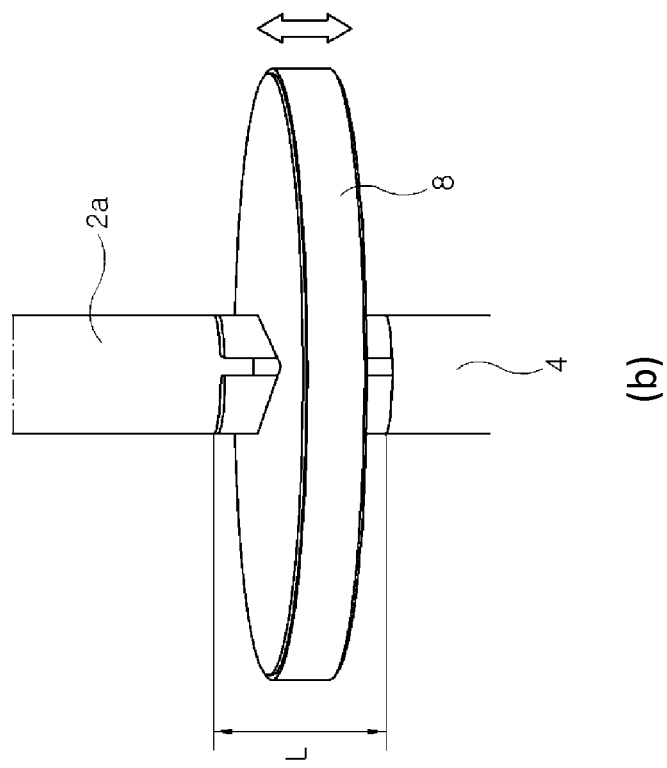
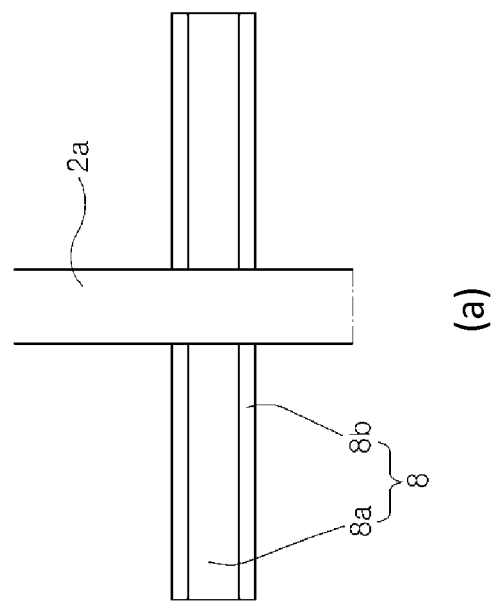

UNITED TYPE MOTOR DRIVEN POWER STEERING SYSTEM

CROSS-REFERENCE TO RELATED APPLICATIONS

The present application claims priority of Korean Patent Application Number 10-2010-0110483 filed Nov. 8, 2010, the entire contents of which application is incorporated herein for all purposes by this reference.

BACKGROUND OF INVENTION

1. Field of Invention

The present invention relates to a motor driven power steering system, and more particularly, to a united type motor driven power steering system that can implement a tilt and telescopic movement, using power of an MDPS (Motor Driven Power Steering) motor that assists steering force.

2. Description of Related Art

In general, MDPS (Motor Driven Power Steering) that is a motor driven steering system assisting steering power by using power from a motor without using hydraulic pressure is commonly used in small-size vehicles.

The MDPS is equipped with a decelerator composed of worm-shaft/worm wheel rotated by a motor to assist steering force and a motor driven column apparatus having a tilt motor and a telescopic motor to implement tilt and telescopic movement.

The MDPS motor is controlled by an MDPS ECU (Electronic Control Unit) while the tilt motor and the telescopic motor are controlled by a separate tilt•tele ECU.

FIG. 10 shows an MDPS motor, a tilt motor, a telescopic motor, and an MDPS ECU and a tilt•tele ECU which control the motors.

As shown in the figure, the MDPS includes a decelerator and an MDPS motor 200 that assist steering force on a column tube 100 covering a steering shaft 100a, a tilt motor 400 that tilts up/down a tilt mechanism, a telemotor 500 that telescopically moves a tele-mechanism, an MDPS ECU 300 that controls MDPS motor 200, and a tilt•tele ECU 600 that controls tilt motor 400 and telemotor 500.

Further, a motor/angle sensor for MDPS, a motor/angle sensor for tilt, and a motor/angle sensor for telescopic movement are included.

As described above, since the MDPS motor and the MDPS ECU are provided to assist steering force in the MDPS while the tilt motor, the telescopic motor, and a tilt•tele ECU are seperately provided, it is difficulty to make the MDPS in a package, and weight and cost are necessarily increased.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to provide a united type motor driven power steering system that can use only one MDPS motor, without a tilt motor and a telemotor, by converting the power of an MDPS motor that assists steering force into power for implementing tilt and telescopic movement, and can use only one MDPS ECU, without a tilt•tele ECU, by providing the MDPS ECU with the function of converting power of the MDPS motor.

Various aspects of the present invention provide for a united type motor driven power steering system, including one MDPS motor that generates power, a multi-function generator that is supplied with power of the MDPS motor and switches a power transmission path of the MDPS motor into a steering path for assisting steering force, a tilt path for tilting up/down a column tube, and a telescopic path for telescopic movement of the column tube, and one MDPS ECU that has a control logic for switching the power transmission path of the MDPS motor into the steering path, the tilt path, and the telescopic path, and makes CAN communication with a torque sensor and an angle sensor of the MDPS motor.

The steering path is for transmitting the power of the MDPS motor to a worm wheel gear of a steering shaft engaged with a worm gear, when the multi-function generator is in a non-operation mode controlled by the MDPS ECU.

The multi-function generator includes a motor power converting unit that is controlled by the MDPS ECU to divide the power of the MDPS motor transmitted to the steering path, a motor power transmitting unit that receives the power of the MDPS motor from the motor power converting unit, and a tilt•telescopic motion unit that is controlled by the MDPS ECU to convert the power transmitted from the motor power transmitting unit to the tilt path and the telescopic path.

The motor power converting unit includes a solenoid that is controlled in receiving current by the MDPS ECU and coupled not to be directly rotated by a motor shaft of the MDPS motor, a transmission gear coupled to the solenoid, a movable rotary plate directly rotated by the motor shaft and moving up/down, an elastic member applying elastic force to push the movable rotary plate from the transmission gear, and a fixed rotary plate having a worm gear shaft rotating a worm wheel gear fitted on the steering shaft.

The solenoid is an electromagnetic coil type that is magnetized by supplied current.

A friction member increasing friction force is disposed on the top and bottom of the movable rotary plate.

The movable rotary plate is combined with the motor shaft of the MDPS motor in a quadrangular cross-sectional structure and slides on the quadrangular cross-sectional portion of the motor shaft.

The motor power transmitting unit includes a coupling gear, a rotary rod having a teeth of the circumference meshed with the coupling gear, a coupling rotary shaft arranged in perpendicular to the rotary rod, an inter-gear fitted on one end of the coupling rotary shaft to be engaged with the teeth of the rotary rod, and an output gear fitted on the coupling rotary shaft, at a predetermined distance from the inter-gear.

The rotary rod is of a worm gear type and the inter-gear is of a worm wheel gear type.

The tilt•telescopic motion unit includes an electronic clutch controlled in the current supply direction by the MDPS ECU and generating reaction force and repulsive force, a power connector sliding left and right by the reaction force and the repulsive force of the electronic clutch, a tilt shaft operating a tilt mechanism forming the tilt path by the sliding of the power connector in one direction, and a telescopic shaft operating a telescopic mechanism forming the telescopic path by the sliding of the power connector in the opposite direction.

The power connector includes a rotary gear receiving force from a magnet forming reaction force for an N-pole of the electromagnetic coil of the electronic clutch and forming repulsive force for an S-pole, and a hollow pipe type of hollow sliding shaft sliding in one direction with the rotary gear by the force from the magnet to be fixed to the tilt shaft by friction, and sliding in the opposite direction to be fixed with the telescopic shaft by friction.

The tilt shaft is a hollow pipe with a screw on the circumference and arranged in a straight line with the hollow sliding shaft, while the telescopic shaft is a bar with a screw on the circumference and fitted in the hollow sliding shaft through the tilt shaft.

The hollow sliding shaft and the tilt shaft are in close contact by flanges generating contact friction force, and the hollow sliding shaft and the telescopic shaft are in close contact by flanges generating contact friction force.

According to various aspects of the present invention, it is possible to make an MDPS with only one motor and one ECU, because power for tilt and telescopic movement is supplied to the MDPS motor for assisting steering force, and a tilt•tele ECU function is implemented with an MDPS ECU.

Further, it is possible to more freely make the MDPS in a package and reduce the weight and cost by achieving the MDPS with only one motor and one ECU.

Further, according to various aspects of the present invention, it is possible to implement a fail-safety function by switching to a manual mode when the MDPS motor is locked, using an electronic clutch that switches the power of the MDPS motor into power for tilt and telescopic movement.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 4(a) and (b) are views showing an exemplary part of the configuration of a motor power converting unit of the united type motor driven power steering system of FIG. 1 according to the present invention.

Figure 1:
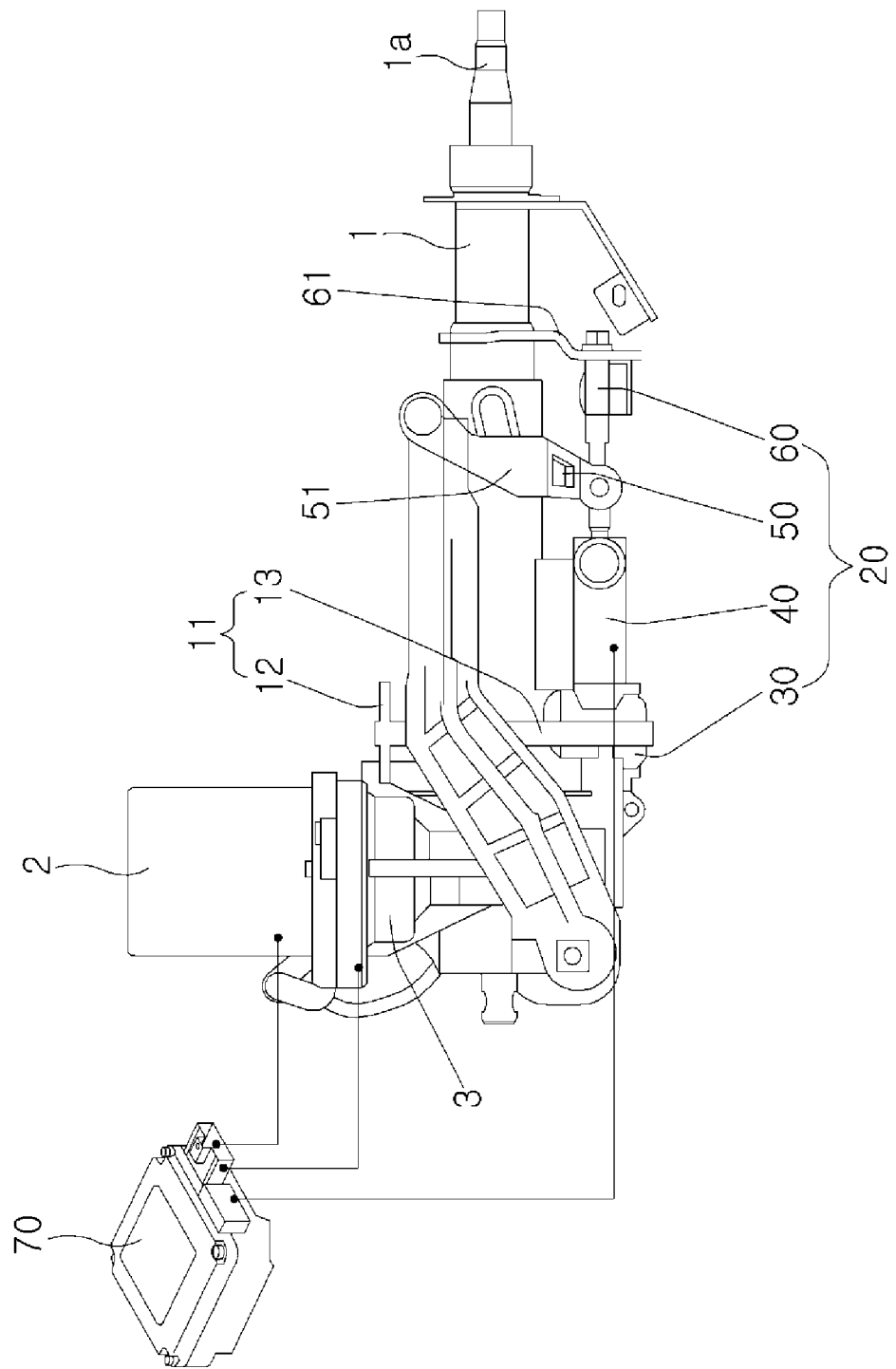
FIG. 1 is a view showing the configuration of an exemplary united type motor driven power steering system according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention are described hereafter in detail with reference to the accompanying drawings, and the exemplary embodiments can be achieved in various ways by those skilled in the art and the present invention is not limited to the embodiments.

Referring to FIG. 1, a u-MDPS (United Type Motor Driven Power Steering) system includes one MDPS motor 2 that assists steering force to a steering shaft 1a covered by a column tube 1 by transmitting power to a decelerator composed of a worm gear and a worm wheel gear, one MDPS ECU (Electronic Control Unit) 70 that controls MDPS motor 2 in response to a signal from a sensor detecting the steering state, and a multi-function generator that is controlled by MDPS ECU 70 to implement tilt up/down and telescopic movement by using power from MDPS motor 2.

The multi-function generator tilts up/down column tube 1 and implements telescopic movement, using the power from MDPS motor 2.

Figure 2:
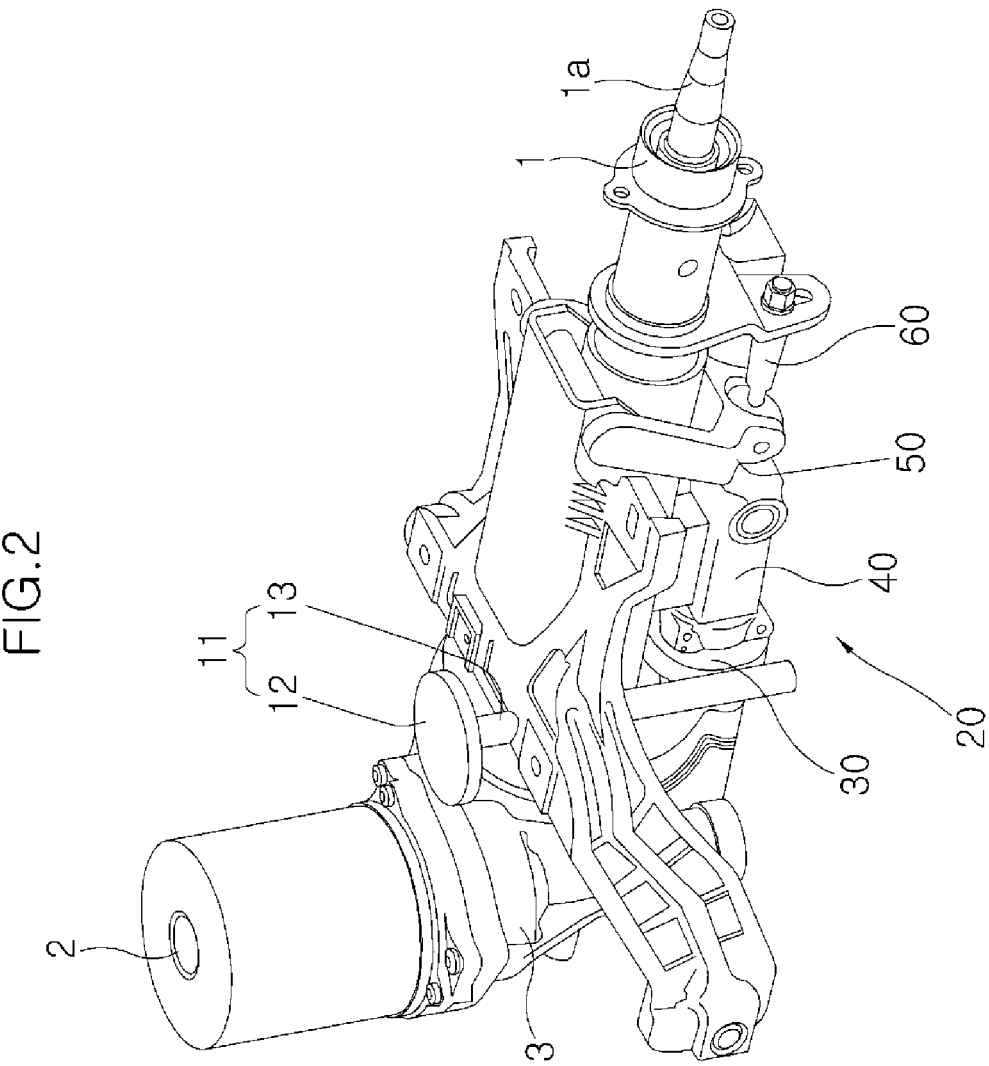
FIG. 2 is a perspective view showing the united type motor driven power steering system of FIG. 1 according to the present invention.

Referring to FIG. 2, the multi-function generator includes a motor power converting unit 3 that is controlled by MDPS ECU 70 to convert the power of MDPS motor 2 into power for tilt and telescopic movement, a motor power transmitting unit 11 that receives power of MDPS motor 2 from motor power converting unit 3, and a tilt•telescopic motion unit 20 that is controlled by MDPS ECU 70 to implement tilt-up/down and telescopic movement, using the power transmitted from motor power transmitting unit 11.

Figure 3:
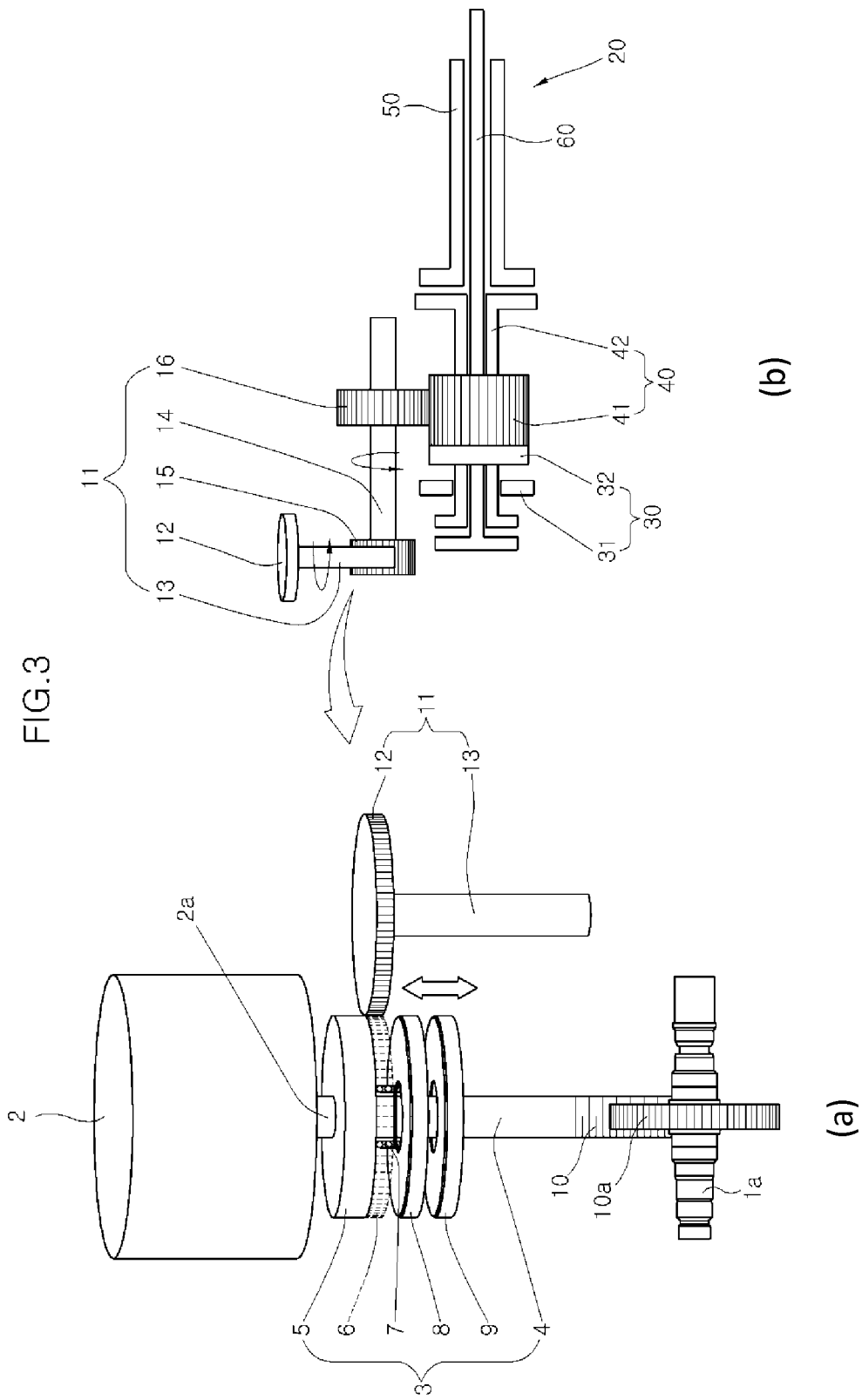
FIGS. 3(a) and (b) are views showing the configuration of an exemplary multi-function generator of the united type motor driven power steering system of FIG. 1 according to the present invention.

Referring to FIGS. 3(a) and (b), motor power converting unit 3 includes a solenoid 5 that is controlled by MDPS ECU 70 and coupled in order not to be directly rotated by a motor shaft 2a of motor 2, a transmission gear 6 with teeth on the circumference and coupled to solenoid 5, a movable rotary plate 8 that is directly rotated by motor shaft 2a and moves up/down, an elastic member 7 that applies elastic force to push movable rotary plate 8 from transmission gear 6, and a fixed rotary plate 9 that fixed on a work gear shaft 4 with a worm gear 10 engaged with a worm wheel gear 10a that assists steering force.

Solenoid 5 is equipped with an electromagnet coil that is magnetized by current and transmission gear 6 is magnetized by magnetic force generated by solenoid 5 to pull movable rotary plate 8.

The magnetic force is generated in a magnitude that is enough to pull movable rotary plate 8 against the elastic force of elastic member 7, with transmission gear 6.

Elastic member 7 may be a coil spring with one end fixed to motor shaft 2a of MDPS motor 2 and the other end fixed to movable rotary plate 8.

Referring to FIGS. 4(a) and (b), movable rotary plate 8 is composed of a plate body 8a that may be made of steel or the like and fitted on the end portion of motor shaft 2a of MDPS motor 2, and a friction member 8b that is coated on the top and bottom of plate body 8a.

Plate body 8a is combined with motor shaft 2a in a structure, in various embodiments preferably a quadrangular cross-sectional structure, to receive torque from motor shaft 2a and slides on motor shaft 2a and the quadrangular cross-sectional section L of motor shaft 2a depends on the magnitude of magnetic force generated by solenoid 5.

Fixed rotary plate 9 may be integrally and/or monolithically formed with worm gear shaft 4 with worm gear 10 engaged with worm wheel gear 10a that assists the steering force, or formed in an independent part which can be assembled later.

As described above, motor power converting unit 3 functions as an electromagnetic clutch that transmits or cuts off the power from MDPS 2 to worm gear shaft 4 by connecting/disconnecting movable rotary plate 8 and fixed rotary plate 9, using the magnetic force of solenoid 5.

Referring to FIGS. 3(a) and (b), motor power transmitting unit 11 is composed of a coupling gear 12 with teeth on the circumference, a rotary rod 13 with teeth on the circumference at the other end portion where coupling gear 12 is not fitted, a coupling rotary shaft 14 arranged perpendicular to rotary rod 13, an inter-gear 15 fitted on coupling rotary shaft 14 and engaged with teeth of rotary rod 13, and an output gear 16 fitted on coupling rotary shaft 14, at a predetermined distance from inter-gear 15.

Rotary rod 13 is formed in a worm gear type, for example, having a worm gear, and inter-gear 15 is formed in a worm wheel gear type, for example, having a gear wheel complementary to the worm gear.

As described above, motor power transmitting unit 11 transmits the power of MDPS motor 2 disconnected from worm gear shaft 4, when current is supplied to solenoid 5.

Referring to FIGS. 3(a) and (b), tilt•telescopic motion unit 20 is composed of an electronic clutch 30, a power connector 40 that is rotated by motor power transmitting unit 11 receiving the power from MDPS motor 2 and slid by the operation of electronic clutch 30, and a tilt•telescopic shaft that is coupled and rotated with power connector 40 in accordance with sliding of power connector 40.

Electronic clutch 30 is composed of an electromagnet coil 31 that switches a pole in the direction of supplied current and a magnet 32 that generates repulsive force toward the pole of electromagnet coil 31 or reaction force away from the poles.

For exemplary configurations, magnet 32 is provided with one pole (N-pole or S-pole) and forward current (forming N-pole) and backward current (forming S-pole) are supplied to electromagnetic coil 31.

Power connector 40 is composed of a hollow sliding shaft 42 of a hollow pipe type (e.g., a hollow cylindrical shaft) with flanges at both ends and a rotary gear 41 fixed to hollow sliding shaft 42 rotates hollow sliding shaft 42.

Magnet 32 is fixed to one side of rotary gear 41 and magnet 32 moves on hollow sliding shaft 42 by being pushed by the reaction force or pulled by the repulsive force due to the pole of electromagnetic force 31.

A friction structure or friction member for increasing contact friction force is disposed at the flanges at both ends of hollow sliding shaft 42.

The tilt•telescopic shaft is composed of a screw type tilt shaft 50 (e.g., including a threaded shaft) operating tilt mechanism 51 and a screw type telescopic shaft 60 (e.g., including a threaded shaft) operating telescopic mechanism 61. Mechanisms 51 and 61 are shown in FIG. 1.

Tilt shaft 50 is a hollow pipe with a screw on the circumference, having a flange at one end and arranged in a straight line with hollow sliding shaft 42, while telescopic shaft 60 is a bar with a screw on the circumference, having a flange at one end and passing tilt shaft 50 from hollow sliding shaft 42.

A friction structure of a friction member for increasing friction force is disposed at the flanges of tilt shaft 50 and telescopic shaft 60.

Tilt mechanism 51 tilts up/down column tube 1 by being pulled or pushed by rotation of tilt shaft 50, which is the same as common tilt-up/down.

Telescopic mechanism 61 telescopically moves up/down column tube 1 by being pulled or pushed by rotation of telescopic shaft 60, which is the same as common telescopic movement.

Figure 5:
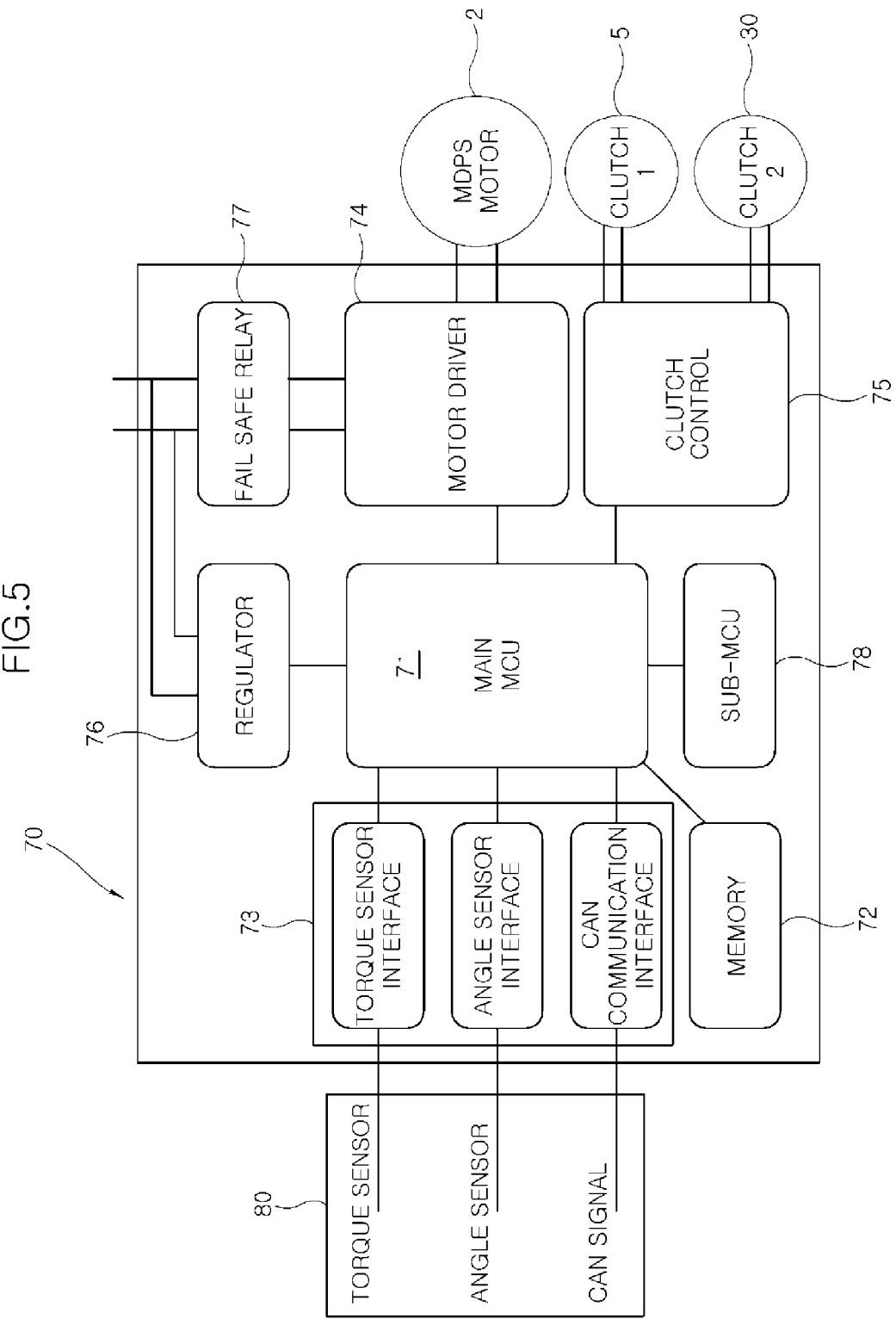
FIG. 5 is a view showing the configuration of an exemplary united type MDPS ECU according to the present invention.

Referring to FIG. 5, MDPS ECU 70 is composed of a main MCU 71 (Microprocessor Control Unit) that is a processor processing a logic, a memory 72, a sensor interface 73 that makes CAN (Controller Area Network) communication with a sensor 80, a motor driver 74 that controls MDPS motor 2, a clutch controller 75 that controls solenoid 5 and electronic clutch 30, and a sub-MCU 78 that is a processor that assists main MCU 71.

Further, MDPS ECU 70 further includes a regulator 76 that adjusts supply voltage and a relay 77 for fail-safe.

As described above, by adding a control logic operating clutch controller 75 that controls solenoid 5 and electronic clutch 30 in main MCU 71, MDPS ECU 70 can switches power transmission path of MDPS motor 2 for assisting the steering force or implementing tilt and telescopic operation.

Sensor 80 includes a torque sensor and an angle sensor of MDPS motor 2 making CAN communication with MDPS ECU 70.

Figure 6:
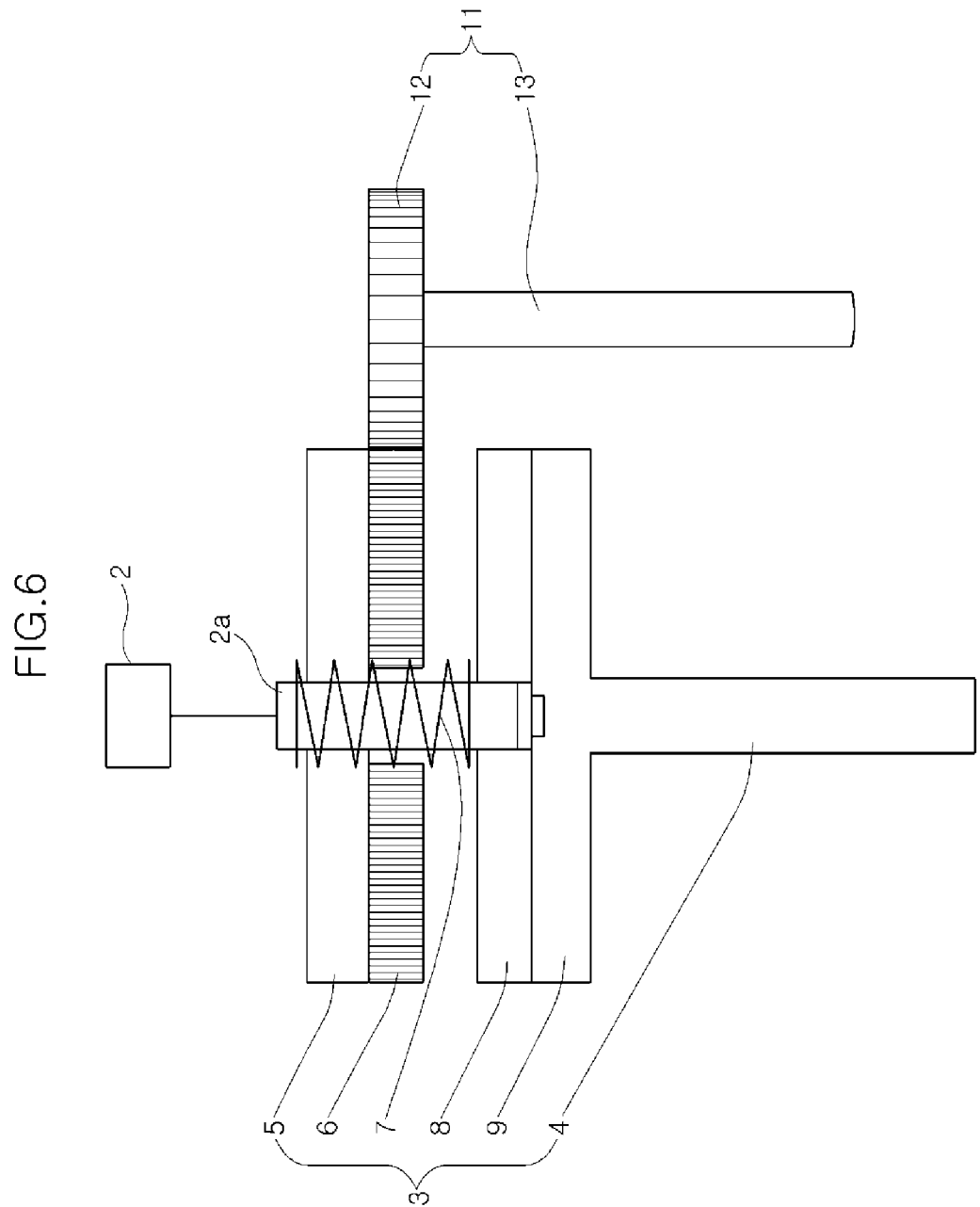
FIG. 6 is a view showing the operation using, as steering force, MDPS motor power of the united motor driven power steering system of FIG. 1 according to the present invention.

Referring to FIG. 6, MDPS motor 2 and worm gear shaft 4 are connected to transmit power by non-operation of motor power converting unit 3, such that the power of MDPS motor 2 is all used to assist the steering force.

That is, when motor power converting unit 3 is in non-operation mode, MDPS ECU 70 cuts off the current, such that solenoid 5 cannot generate magnetic force and movable rotary plate 8 released from the solenoid 5 is pushed by the elastic force of the elastic member 7 and fixed in close contact with fixed rotary plate 9.

In this state, the power of MDPS motor 2 is transmitted to fixed rotary plate 9 through movable rotary plate 8 fitted on motor shaft 2a and fixed rotary plate 9 rotates with worm gear shaft 4 where fixed rotary shaft 9 is fixed.

The rotation of worm gear shaft 4 is transmitted to worm wheel gear 10a engaged with worm gear 10 on worm gear shaft 4 and the rotation of worm wheel gear 10a is transmitted to a steering shaft 1a where worm gear 10a is fitted, such that the steering force is assisted by the power of MDPS motor 2.

Figure 7:
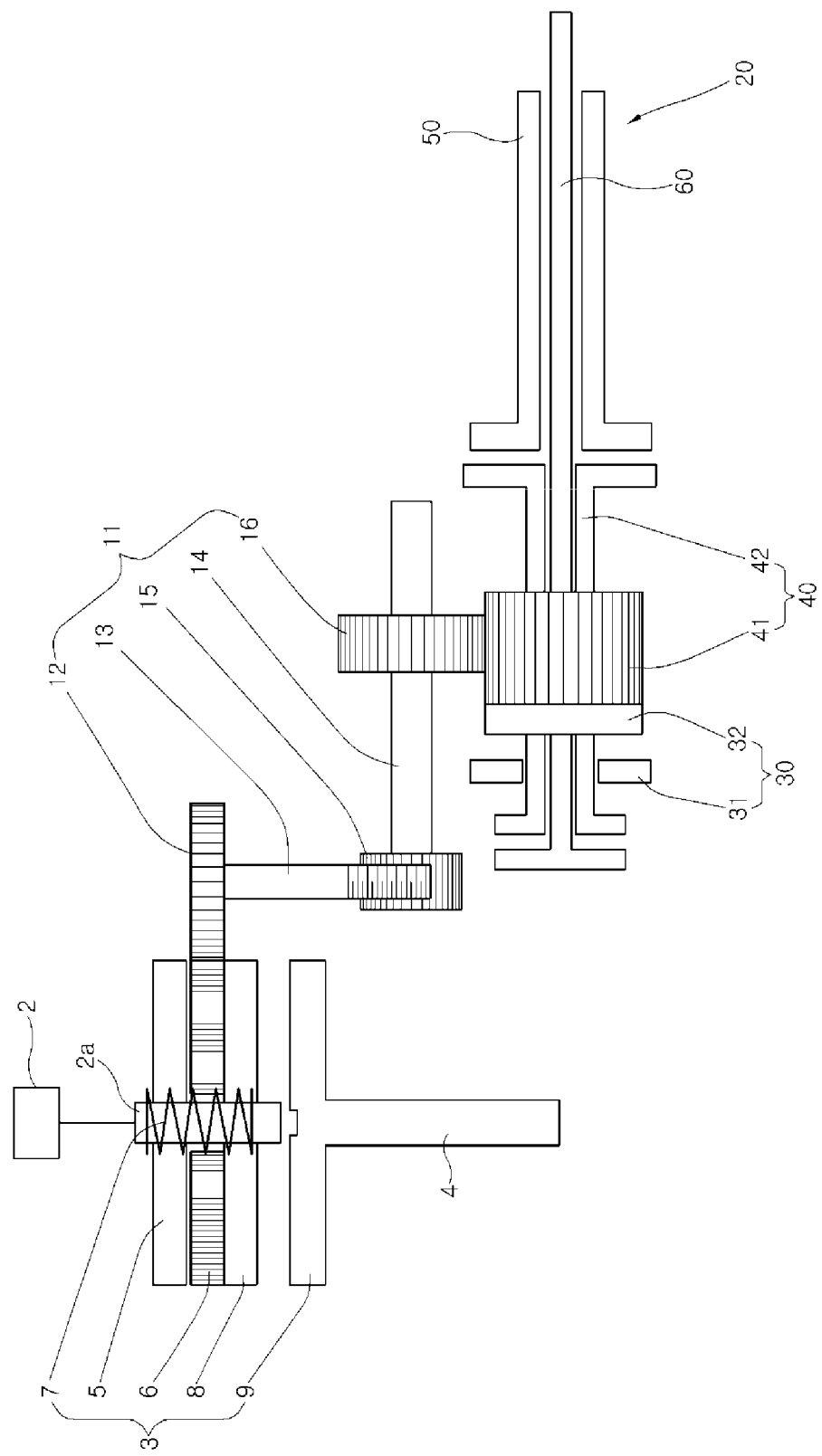
FIG. 7 is a view showing the operation converting the MDPS motor power of the united motor driven power steering system of FIG. 1 according to the present invention into tilt and telescopic operational force.

Referring to FIG. 7, MDPS motor 2 and worm gear shaft 4 are disconnected by the operation of motor power converting unit 3, such that the power of MDPS motor 2 is all used to implement the tilt and telescopic operation.

That is, when motor power converting unit 3 operates, MDPS ECU 70 supplies the current, such that solenoid 5 generates magnetic force and movable rotary plate 8 pulled by the magnetic force of solenoid 5 is fixed in close contact with fixed rotary plate 6 while compressing elastic member 7.

In this state, fixed rotary plate 9 is completely separated from movable rotary plate 8, not to receive power from MDPS motor 2, such that worm gear shaft 4 fixed to fixed rotary plate 9 does not rotate.

In this state, the power of MDPS motor 2 is transmitted to transmission gear 6 through movable rotary shaft 8 fitted on motor shaft 2a and motor power transmission unit 11 is driven by transmission gear 6, such that the power of MDPS motor 2 that assists the steering force is all converted into the force for tilt and telescopic operation.

That is, the power of MDPS motor 2 is transmitted to coupling gear 12 engaged and rotated with transmission gear 6, coupling gear 12 rotates rotary rod 13 fixed thereto, such that inter-gear 15 engaged with the teeth of rotary rod 13 is rotated by the rotation of rotary rod 13.

The coupling rotary shaft 14 fixing inter-gear 15 is rotated by the rotation of inter-gear 15 and output gear 16 fixed on coupling rotary shaft 14 is rotated by the rotation of coupling rotary shaft 14.

The torque of coupling rotary shaft 14 is transmitted to tilt•telescopic motion unit 20 and the power transmitted to tilt•telescopic motion unit 20 is converted into power for tilting-up/down or telescopic movement, in accordance with the operation direction of electronic clutch 30 controlled by MDPS ECU 70.

Figure 8:
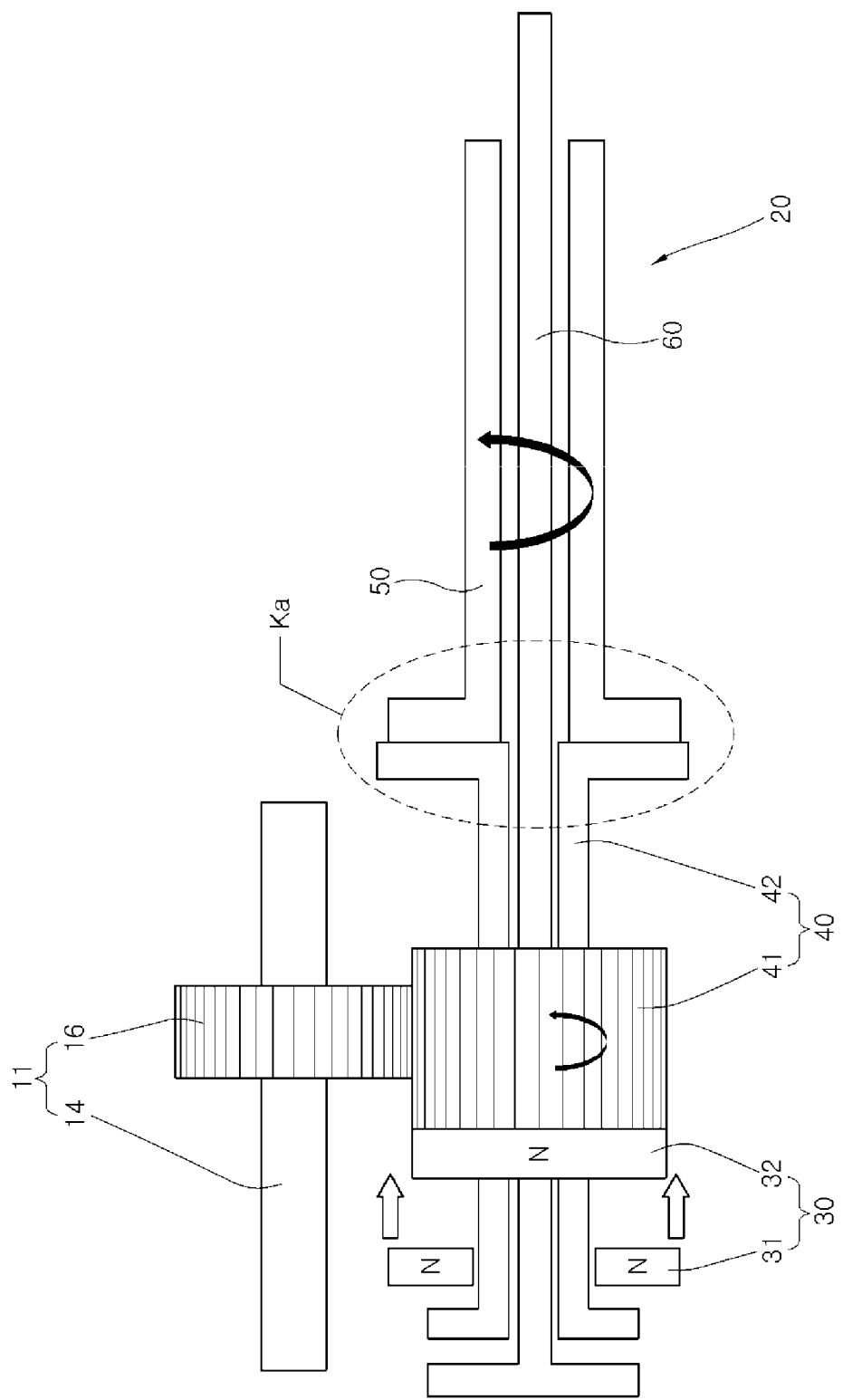
FIG. 8 is a view showing the tilt operation using the MDPS motor power of the united motor driven power steering system of FIG. 1 according to the present invention.

Referring to FIG. 8, since power connector 40 has received power of MDPS motor 2 through motor power transmitting unit 11, rotary gear 41 is rotated by output gear 16 and hollow sliding shaft 42 fixing rotary gear 41 is also rotated.

In this state, as MDPS ECU 70 generates an N-pole in electromagnetic coil 31, which is the same pole as magnet 32 with an N-pole, by supplying forward current to electronic clutch 30, power connector 40 is coupled to tilt shaft 50 for tilting-up/down.

That is, electromagnetic coil 31 having the same N-pole as magnet 32 pushes magnet 32 and rotary gear 41 by reaction force, and as rotary gear 41 is pushed, hollow sliding shaft 42 fixing it is moved in the same direction (right in FIG. 8) and coupled to tilt shaft 50.

Hollow sliding shaft 42 and tilt shaft 50 are fixed in close contact Ka by flanges, in which strong fixing force is generated by the friction structures of the friction members on the flanges.

Accordingly, tilt shaft 50 rotates at the position with hollow sliding shaft 42 and tilt mechanism 51 coupled to tilt shaft 50 by the screws tilts up/down column tube 1 by the rotation of tilt shaft 50.

Figure 9:
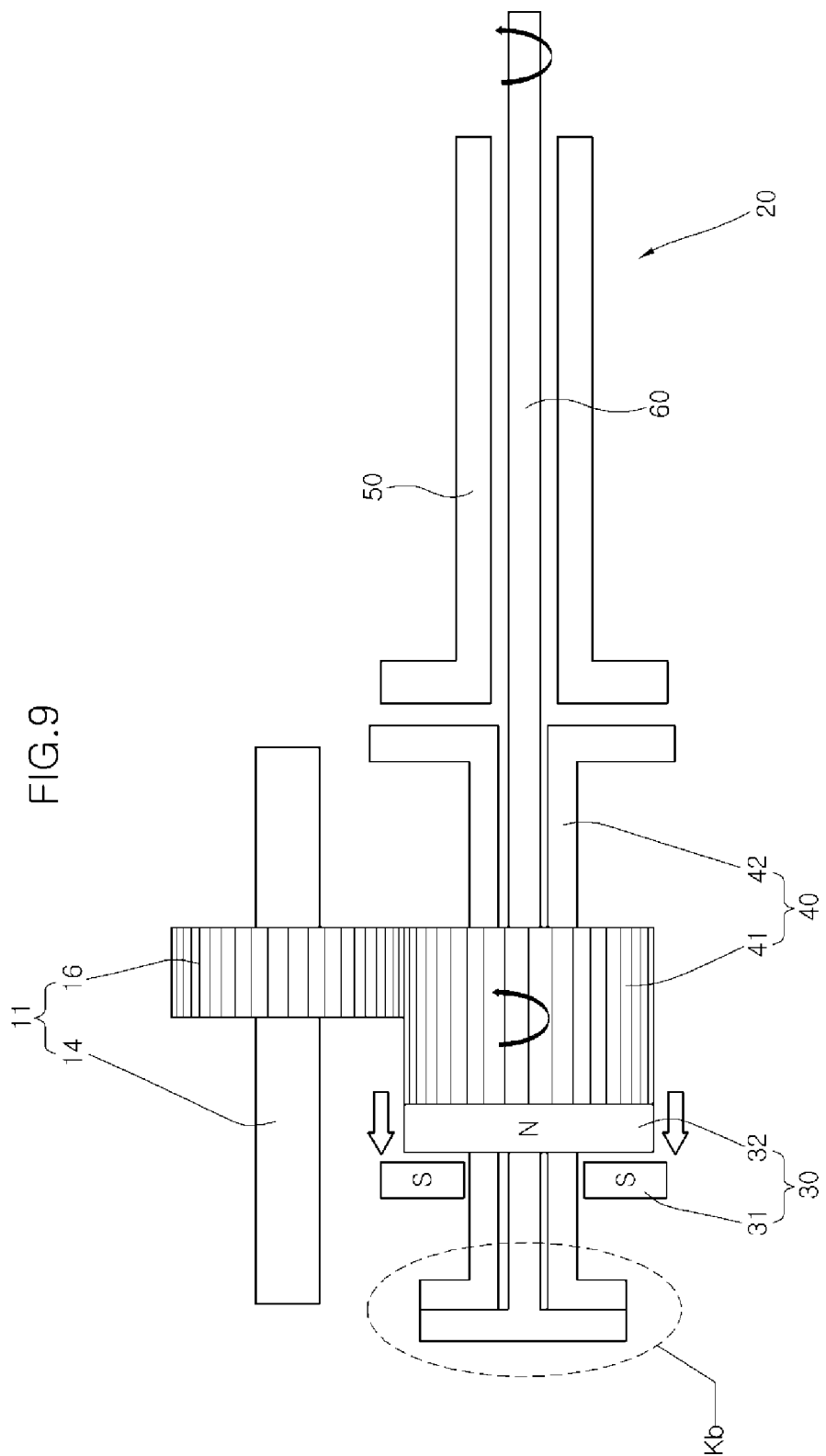
FIG. 9 is a view showing the telescopic operation using the MDPS motor power of the united motor driven power steering system of FIG. 1 according to the present invention.
Figure 10:
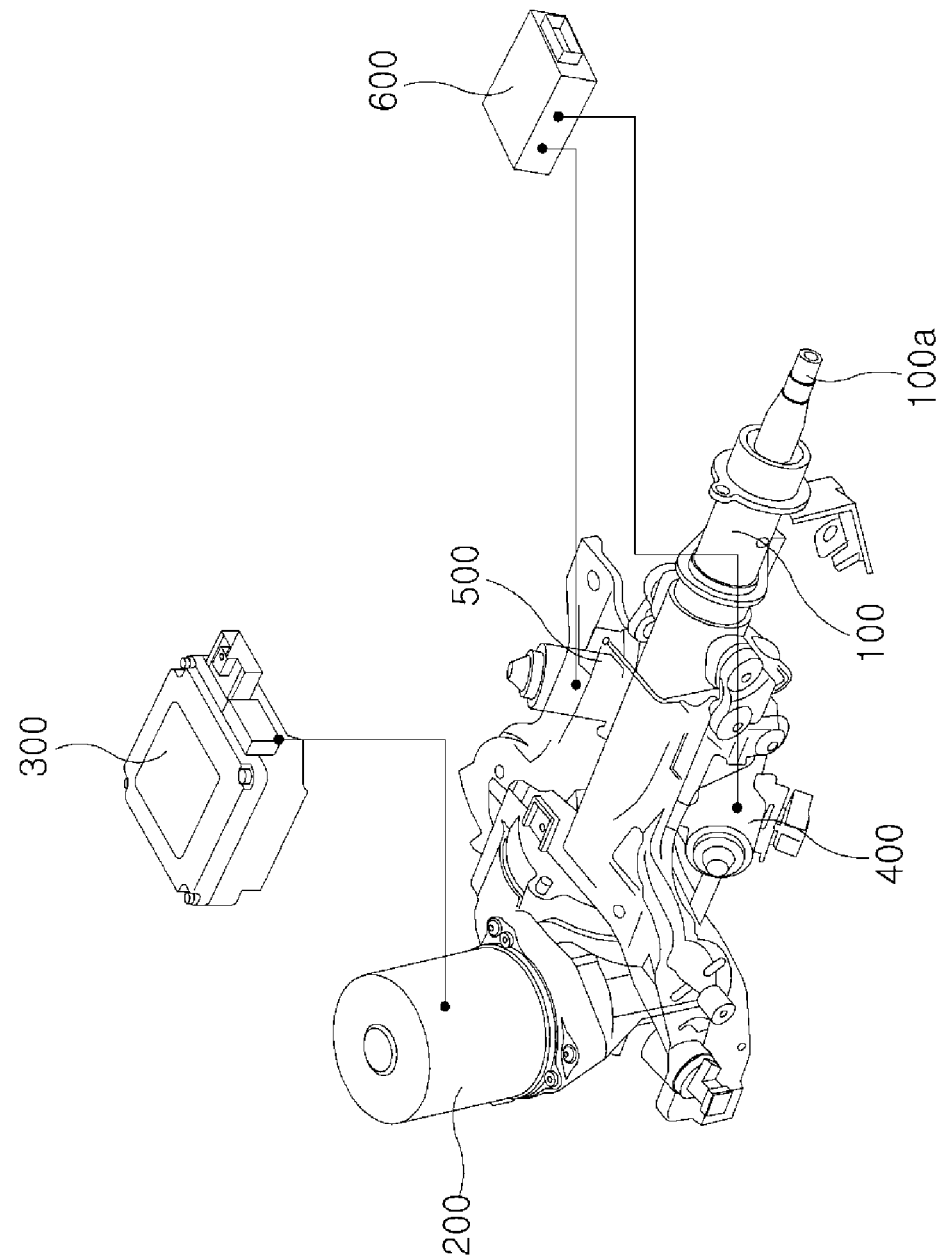
FIG. 10 is a view showing the configuration of a motor driven power steering system of the related art.

Referring to FIG. 9, since power connector 40 has received power of MDPS motor 2 through motor power transmitting unit 11, rotary gear 41 is rotated by output gear 16 and hollow sliding shaft 42 fixing rotary gear 41 is also rotated.

In this state, as MDPS ECU 70 generates a S-pole in electromagnetic coil 31, which is opposite to the pole of magnet 32 with an N-pole, by supplying backward current to electronic clutch 30, power connector 40 is combined with tilt shaft 60 for telescopic movement.

That is, electromagnetic coil 31 having the S-pole opposite to magnet 32 pulls magnet 32 and rotary gear 41 by repulsive force, and as rotary gear 41 is pulled, hollow sliding shaft 42 fixing it is moved in the same direction (left in FIG. 9) and coupled to telescopic shaft 60.

Hollow sliding shaft 42 and tilt shaft 60 are fixed in close contact Kb by flanges, in which strong fixing force is generated by the friction structures of the friction members on the flanges.

Accordingly, telescopic shaft 60 rotates at the position with hollow sliding shaft 42 and telescopic mechanism 61 coupled to telescopic shaft 60 by the screws tilts up/down column tube 1 by the rotation of telescopic shaft 60.

As described above, since the u-MDPS according to the exemplary embodiments switches the power transmission path of one MDPS motor 2, using one MDPS ECU 70, the MDPS can be more freely formed in a package while the weight and cost can be reduced. In particular, it is possible to implement fail-safety function by switching to a manual mode when one MDPS motor 2 is locked, using the electromagnetic clutch.

For convenience in explanation and accurate definition in the appended claims, the terms "up" or "down", "left" or "right" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A united motor driven power steering system, comprising:
    one MDPS (Motor Driven Power Steering) motor generating power;
    a multi-function generator receiving and transmitting a power of the MDPS motor to a steering path for assisting a steering force, a tilt path for tilting up/down a column tube, or a telescopic path for facilitating a telescopic movement of the column tube; and
    one MDPS ECU (Electronic Control Unit) having a control logic to switch a power transmission path of the MDPS motor into the steering path, the tilt path, or the telescopic path, and make CAN (Controller Area Network) communication with sensors.

2. The united motor driven power steering system as defined in claim 1, wherein the steering path transmits the power of the MDPS motor to a worm wheel gear of a steering shaft engaged with a worm gear, when the multi-function generator is in a non-operation mode controlled by the MDPS ECU.

3. The united motor driven power steering system as defined in claim 1, wherein the multi-function generator comprises:
    a motor power converting unit receiving the power of the MDPS motor, and separating the steering path from the tilt path and the telescopic path under control of the MDPS ECU;
    a motor power transmitting unit receiving a power from the motor power converting unit; and
    a tilt•telescopic motion unit transmitting the received power of the motor power transmitting unit to the tilt path or the telescopic path under control of the MDPS ECU.

4. The united motor driven power steering system as defined in claim 3, wherein the motor power converting unit comprises:

a solenoid receiving a current controlled by the MDPS ECU and coupled with the MDPS motor in a way such that a motor shaft of the MDPS motor does not rotate the solenoid directly;
a transmission gear coupled to the solenoid;
a movable rotary plate directly rotated by the motor shaft and moving up/down;
an elastic member applying an elastic force to push the movable rotary plate from the transmission gear; and
a fixed rotary plate having a worm gear shaft rotating a worm wheel gear fitted on a steering shaft.

5. The united motor driven power steering system as defined in claim 4, wherein the solenoid is of an electromagnetic coil magnetized by the current.

6. The united motor driven power steering system as defined in claim 4, wherein a friction member is disposed on a top and bottom of the movable rotary plate to increase a friction force.

7. The united motor driven power steering system as defined in claim 4, wherein the movable rotary plate is combined with the motor shaft of the MDPS motor in a quadrangular cross-sectional structure and slides on the quadrangular cross-sectional portion of the motor shaft.

8. The united motor driven power steering system as defined in claim 3, wherein the motor power transmitting unit comprises:
a coupling gear coupled with the motor power converting unit;
a rotary rod connected to the coupling gear and having teeth on a circumference of a distal end portion of the rotary rod;
a coupling rotary shaft arranged in perpendicular to the rotary rod;
an inter-gear fitted on an end of the coupling rotary shaft and engaged with the teeth of the rotary rod; and
an output gear fitted on the coupling rotary shaft at a predetermined distance from the inter-gear.

9. The united motor driven power steering system as defined in claim 8, wherein the rotary rod includes a worm gear and the inter-gear includes a complementary a worm wheel gear.

10. The united motor driven power steering system as defined in claim 3, wherein the tilt•telescopic motion unit comprises:
an electronic clutch generating a reaction force or a repulsive force based on a direction of the current controlled by the MDPS ECU;
a power connector rotating by the motor power transmitting unit and sliding by the reaction force or the repulsive force of the electronic clutch;
a tilt shaft operating a tilt mechanism and forming the tilt path by sliding the power connector in a direction; and
a telescopic shaft operating a telescopic mechanism and forming the telescopic path by sliding the power connector in an opposite direction.

11. The united motor driven power steering system as defined in claim 10, wherein the electronic clutch comprises:
an electromagnet coil switching a pole of the electromagnet coil in the direction of the current controlled by the MDPS ECU; and
a magnet generating the repulsive force toward the pole of the electromagnet coil for an S-pole of the electromagnetic coil or the reaction force away from the pole of the electromagnet coil for an N-pole of the electromagnetic coil.

12. The united motor driven power steering system as defined in claim 11, wherein the power connector comprises:
a rotary gear having a side fitted to the magnet to receive the repulsive force or the reaction force from the magnet; and
a hollow sliding shaft of a hollow pipe fitted with the rotary gear, and sliding with the rotary gear in a direction to be fixed to the tilt shaft by friction or in an opposite direction to be fixed with the telescopic shaft by friction.

13. The united motor driven power steering system as defined in claim 12, wherein the tilt shaft is of a hollow pipe with a screw on a circumference of the tilt shaft and arranged in a straight line with the hollow sliding shaft, and the telescopic shaft is a bar with a screw on a circumference of the telescopic shaft and fitted in the hollow sliding shaft through the tilt shaft.

14. The united motor driven power steering system as defined in claim 13, wherein the hollow sliding shaft and the tilt shaft are in close contact by flanges generating contact friction forces, and the hollow sliding shaft and the telescopic shaft are in close contact by flanges generating contact friction forces.

15. The united motor driven power steering system as defined in claim 1, wherein the MDPS ECU comprises:
a main MCU (Microprocessor Control Unit) processing a logic;
a memory;
a sensor interface making CAN (Controller Area Network) communications with the sensors;
a motor driver controlling the MDPS;
a clutch controller controlling a solenoid and an electronic clutch; and
a sub-MCU assisting the main MCU.

16. The united motor driven power steering system as defined in claim 15, wherein the MDPS ECU further comprises a regulator adjusting a supply voltage and a relay for facilitating a fail-safety function.

* * * * *